United States Patent [19]

Pouchol

[11] 4,210,564

[45] Jul. 1, 1980

[54] AQUEOUS DISPERSIONS OF POLYVINYLBUTYRAL

[75] Inventor: Jean-Marie Pouchol, Lyons, France

[73] Assignee: Rhone-Poulenc Industries, Paris, France

[21] Appl. No.: 851,768

[22] Filed: Nov. 15, 1977

[30] Foreign Application Priority Data

Nov. 24, 1976 [FR] France ................. 76 36147
Mar. 31, 1977 [FR] France ................. 77 10493

[51] Int. Cl.$^2$ ............................................. C08L 29/04
[52] U.S. Cl. ........................ 260/29.6 B; 260/29.6 MP; 260/29.6 H; 260/29.6 R; 427/388.3; 427/338.4; 428/460; 525/60
[58] Field of Search ........ 260/73 L, 29.6 MP, 29.6 B, 260/29.6 H, 29.6 R; 526/9

[56] References Cited

U.S. PATENT DOCUMENTS

| | | | |
|---|---|---|---|
| 3,153,009 | 10/1964 | Rombach | 260/73 L |
| 3,234,161 | 2/1966 | Snelgrove | 260/73 L |
| 3,926,918 | 12/1975 | Shibata et al. | 260/73 L |

FOREIGN PATENT DOCUMENTS 895428 5/1962 United Kingdom .

*Primary Examiner*—Melvyn I. Marquis
*Attorney, Agent, or Firm*—Burns, Doane, Swecker & Mathis

[57] ABSTRACT

A method of preparing a plasticizer-free aqueous dispersion of polyvinylbutyral is disclosed. The method effects simultaneous butyralization and dispersion, forming aqueous dispersions of polyvinylbutyral having a particle size between 0.01 and 5$\mu$. The dispersion exhibits utility in protective coatings for metallic support surfaces.

19 Claims, No Drawings

AQUEOUS DISPERSIONS OF POLYVINYLBUTYRAL

BACKGROUND OF THE INVENTION

1. Field of the Invention

The present invention relates to aqueous dispersions of polyvinylbutyrals having particular utility as coatings for metallic surfaces.

2. Description of the Prior Art

Various processes have been described which produce aqueous dispersions of polyvinylacetals. Thus, French Pat. No. 1,220,859 describes the production of polyvinylacetal dispersions by conducting the acetalization of the polyvinyl alcohol and the dispersion of the resultant acetal in a single operation. The reaction is accomplished at temperatures of between 70° and 80° C. in the presence of acid catalysts, particularly, alkylarylsulphonates containing one higher alkyl group, phenylcogasinic acid or phenylsinarolsulphonic acid.

The polyvinylacetals exhibit valuable properties as coatings. However, heretofore it has been necessary to use them in solution with organic solvents, and in the case of polyvinylbutyral, to incorporate large amounts of plasticizer in the solution. The organic solvent is required to maintain the stability of the dispersion while the plasticizer is required to increase adherence of the coating to the substrate. Thus, there remains a need in the art for an improved method of forming an aqueous dispersion of polyvinylbutyral which can be used as a coating without the inclusion of organic solvents or plasticizers.

SUMMARY OF THE INVENTION

Accordingly, it is a primary object of the present invention to provide an improved method for preparing an aqueous dispersion of polyvinylbutyral free from plasticizer.

Another object of the invention is to provide an improved coating composition comprising an aqueous dispersion of polyvinylbutyral which is free from plasticizer.

Still another object of the invention is to provide a method of coating a metallic element with an aqueous dispersion of polyvinylbutyral which contains no plasticizer.

Other objects and advantages of the present invention will become apparent to those of skill in the art after examining the detailed description which follows.

DETAILED DESCRIPTION OF THE INVENTION

The foregoing objects and advantages are accomplished by providing aqueous dispersions of polyvinylbutyrals, which have a particle size of between 0.01 and 5μ (1μ=1 micron) and contain no plasticizer, characterized in that the butyralization of the aqueous solution of polyvinyl alcohol and the dispersion of the product butyral are carried out simultaneously at a temperature less than 30° C., in the presence of phosphoric acid as a condensation catalyst. The butyralization agent is a mixture of butanal and an α-aldehydic acid in a weight ratio of between 99/1 and 80/20, and preferably between 95/5 and 85/15.

According to a preferred embodiment, aqueous solutions of polyvinyl alcohols, having a solids content between 5 and 25%, and preferably between 10 and 20%, are used. In addition, the polyvinyl alcohols used in accordance with the invention have an ester number of less than 50, that is to say a degree of hydrolysis of more than 96% in the molecule. Their viscosity is generally low and of the order of 4 to 20 mPl in a 4% strength solution in water at 20° C.

Butanal in admixture with an aldehydic acid is employed to effect the butyralization. The α-aldehydic acid which is glyoxylic acid is preferably selected and lead to good results.

The molar ratio between this mixture and the polyvinyl alcohol generally varies between 0.7 and 1 according to the composition of the desired end product.

Phosphoric acid is very suitable as an acid condensation catalyst. The amounts used are usually such that the pH of the reaction medium, i.e., the polyvinyl alcohol solution, aldehyde, α-aldehydic acid and surface-active agent, is less than or equal to 2, and preferably in the order of 1.1 to 1.5. It has been discovered that the use of an aldehydic acid makes it possible to reduce the amount of phosphoric acid which is required to obtain this pH.

Anionic surface-active agents, of the type well known to those of skill in the art, are preferably employed. These include alkali metal salts of saturated or unsaturated long-chain fatty acids, the alkali metal alkylarylsulfonates or the alkali metal alkylsulfates. Significant amounts of surface-active agent are used, usually ranging from 4 to 6% by weight relative to the product polymer.

The reaction is conducted according to the following procedure:

The surface-active agent, the mixture of aldehydes and the catalyst are sequentially introduced into an aqueous solution of polyvinyl alcohol which is continuously stirred vigorously. The reaction mixture is maintained at ambient temperature, i.e., 20° to 22° C., by a conventional cooling device, for a duration of 1 to 2 hours. At the end of the reaction, the temperature can be allowed to increase to about 30° C. to terminate the butyralization more rapidly.

From the start of the butyralization reaction, a change in appearance of the reaction medium is observed. The limpid, fluid solution increases in viscosity while becoming opaque, and subsequently becomes fluid and white. It is at this point that the dispersion is forming. The size of the particles formed in the dispersion depends primarily on the stirring speed and the amount of surface-active agent.

The dispersions obtained according to the process of the invention have a solids content in the order of 10 to 20%. They can be further concentrated by removing water at ambient temperature via known processes, until solids contents of 35 to 45% are obtained. The size of the polyvinylbutyral particles in the dispersion is very fine. It varies from 0.01 to 5μ for the particle agglomerates. The average size is between 0.05 and 1μ. These dispersions are homogeneous and stable, even when neutralized to pH levels of 8 to 9. They are film-forming at temperatures in the order of 40° to 50° C., and can be rendered film-forming at ambient temperature by the addition of plasticizers or coalescence agents, normally employed for vinyl polymers.

The polyvinylbutyral obtained by the process of the invention has a content of polyvinyl alcohol groupings which is usually between 10 and 30%, and more generally between 12 and 25%. The content of polyvinyl acetate groupings is between 1 and 3%. The average molecular weight is between 30,000 and 150,000.

The dispersions obtained by the invention are stable during storage and do not separate. They are useful as a base for more complex compositions comprising, for example, crosslinking resins, fillers and numerous adjuvants. When applied to various supports and dried at temperatures above 40° C., the dispersions lead to coatings which are resistant, homogeneous and of good breaking strength.

The use of α-aldehydric acid and of phosphoric acid in the butyralization mixture produces a polyvinylbutyral dispersion having increased adherence to a metallic support, particularly after wet treatment. Moreover, it has been discovered that the film-forming temperature of the dispersion of the present invention is considerably lower than those heretofore known.

To further illustrate the unique advantages of the various embodiments of the present invention, the following examples are provided. It is understood that their purpose is exclusively illustrative and in no way intended to limit the scope of the invention.

EXAMPLE 1

4,500 cm$^3$ of a 10% strength aqueous solution of polyvinyl alcohol possessing the following characteristics:

viscosity of the 4% strength aqueous solution (20°): 4 mPl ester number: 20 and 36.1 g of an anionic emulsifying agent of sodium laurylsulfate type [5% by weight of the final polymer] were charged into a 6,000 cm$^3$ reactor equipped with an anchor-type stirrer rotating at 300 rpm.

302.5 cm$^3$ of butyraldehyde containing 94.5% of aldehyde was added over a period of a few minutes, while continuously stirring the reaction mixture. After homogenization, the pH of the mixture was 5.6. Next, 27.2 g of glyoxylic acid was added, followed by 10 cm$^3$ of 75% strength phosphoric acid. The pH of the mixture was observed to be 1.2.

The water bath was maintained at 20° C. for 1 hour. Since the reaction was exothermic, the temperature of the reaction mixture fluctuated between 20° and 23° C. without externally supplying heat. During the first hour, particularly between 15 and 30 minutes after the start of the reaction, a change in appearance of the mixture was observed. This manifested itself in an increase in the viscosity of the reaction mixture followed by a decrease in its viscosity. It is within this period of time that the dispersion formed and that the particles assumed their ultimate size.

The butyralization reaction was terminated by heating the product emulsion to 30° C. for 2 hours. It was cooled to 25° C.

The resulting dispersion had the following characteristics:

| | |
|---|---|
| pH | 1.2 |
| residual butanal content (remains stable with time) | 0.2% |
| solids content | 15% |
| BROOKFIELD viscosity at 23° C. at 50 rpm, about | 15 mPl |
| particle dimensions | 0.1 to 1μ |

The polymer itself possessed the following characteristics:

| | |
|---|---|
| viscosity in mPl of the polymer solution in 95° C. strength ethyl alcohol at 20° C. | 10 mPl |
| % by weight of the polyvinyl alcohol groupings, about- | 18.5 |

The dispersion was applied to a steel sheet. Four successive layers were deposited by placing the steel sheets in a centrifuge with the dispersion and drying each layer for 3 minutes at 140° C. A final coating of about 20μ was obtained, which was extremely adherent in the comb-scratching test (Standard Specification NF X 41,002) for more than 300 hours without the appearance of rust. Furthermore, it retained an excellent adhesion to the support. Its observed film-forming temperature had been lowered to 45° C.

EXAMPLE 2

4,500 cm$^3$ of a 10% strength aqueous solution of a polyvinyl alcohol possessing the following characteristics:

viscosity of the 4% strength aqueous solution (20° C.): 4 mPl ester number: 20 and 43.70 g of an anionic emulsifying agent of sodium laurylsulfate type, [6% by weight of the final polymer] were charged into a 6,000 cm$^3$ reactor equipped with an anchor-type stirrer rotating at 300 rpm.

336 cm$^3$ of butylraldehyde, containing 94.5% of aldehyde, are added over a period of a few minutes while continuously stirring the reaction mixture. After homogenization, the pH of the mixture was observed to be 5.6. 20 cm$^3$ of 75% strength phosphoric acid was added. The pH of the mixture was then observed to be 1.2.

The water bath was maintained at 20° C. for 1 hour. Since the reaction was exothermic, the temperature of the mixture fluctuated between 20° and 23° C. without externally supplying heat. During the first hour, particularly between 15 and 30 minites after the start of the reaction, a change in appearance of the mixture was observed. This manifested itself in an increase in the viscosity of the reaction mixture followed by a decrease in its viscosity. It is within this period of time that the dispersion formed and that the particles assumed their ultimate size.

The resulting dispersion had the following characteristics:

| | |
|---|---|
| pH | 1.2 |
| residual butanal content (remains stable with time) | 0.2% |
| solids content | 15% |
| BROOKFIELD viscosity at 23° C. at 50 rpm | 10 to 20 mPl |
| particle dimensions | 0.1 to 1μ |

The polymer itself possessed the following characteristics:

| | |
|---|---|
| viscosity in mPl of the polymer solution in 95° C. strength ethyl alcohol at 20° C. | 9.5 to 10.5 |
| % by weight of the polyvinyl alcohol groupings | 17.5 to 20.5 |

The dispersion was applied to a steel sheet. Four successive layers were deposited by placing the steel sheets in a centrifuge with the dispersion and drying each layer for 3 minutes at 140° C. A final coating of about 20μ was obtained. It was extremely adherent in the comb-scratching test (Standard Specification NF T 30,038) and had good flexibility in the Erichsen deep-drawing test (Standard Specification NF T 30,019). This coating resisted the salt spray test (Standard Specification NF X 41,002) for more than 300 hours without the appearance of rust.

Thus, the dispersions prepared in accordance with the present invention are particularly useful as coatings for metallic supports. By applying the dispersion to such a surface and drying at temperatures between 40° and 50° C. a strongly adherent, protective coating is obtained.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A method for preparing an aqueous dispersion of polyvinylbutyral, free from plasticizer, comprising reacting a mixture of butanal and an α-aldehydic acid with an aqueous solution of polyvinyl alcohol in the presence of phosphoric acid to effect, simultaneously, butyralization of the polyvinyl alcohol and dispersion of the product polyvinylbutyral.

2. The method of claim 1, wherein a surface active agent is introduced into the aqueous solution of polyvinyl alcohol prior to introduction of the mixture of butanal and α-aldehydic acid.

3. The method as defined by claim 1, wherein said butyralization is conducted at a temperature of 30° C. or less.

4. The method as defined by claim 1, wherein the weight ratio of butanal to α-aldehydic acid in said mixture is between about 99:1 and 80:20.

5. The method as defined by claim 1, wherein the weight ratio of butanal to α-aldehydic acid in said mixture is between about 95:5 and 85:15.

6. The method as defined by claim 1, said aqueous solution of polyvinyl alcohol having a solids content between 5 and 25%.

7. The method as defined by claim 6, said aqueous solution of polyvinyl alcohol having a solids content between 10 and 20%.

8. The method as defined by claim 6, the polyvinyl alcohol having a degree of hydrolysis in excess of 96%.

9. The method as defined by claim 1, said α-aldehydic acid being glyoxylic acid.

10. The method as defined by claim 1, the product polyvinylbutyral having a particle size of between 0.01 and 5 microns.

11. The method as defined by claim 10, the product polyvinylbutyral having an average particle size of between 0.05 and 1 micron.

12. The method as defined by claim 1, the pH of the rection medium being no greater than 2.

13. The process as defined by claim 12, the molar ratio between the mixture of butanal and α-aldehydic acid, and the polyvinyl alcohol, being between 0.7 and 1.

14. The method as defined by claim 2, the amount of surface active agent ranging from 4 to 6% by weight of the product polyvinylbutyral.

15. The method as defined by claim 14, said surface active agent being anionic.

16. The method as defined by claim 14, the product polyvinylbutyral having an average molecular weight between 30,000 and 150,000.

17. The method as defined by claim 14, said reaction being conducted under vigorous stirring.

18. The method as defined by claim 17, said resultant dispersion of product polyvinylbutyral having a solids content of 10 to 20%.

19. The method as defined by claim 17, said resultant dispersion of product polyvinylbutyral being concentrated to a solids content of 35 to 45%.

* * * * *